(12) United States Patent
Ballaire

(10) Patent No.: US 10,556,478 B2
(45) Date of Patent: Feb. 11, 2020

(54) SUSPENSION SYSTEM

(71) Applicant: DEERE & COMPANY, Moline, IL (US)

(72) Inventor: Frederic Ballaire, Neustadt an der Weinstrasse (DE)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 15/936,496

(22) Filed: Mar. 27, 2018

(65) Prior Publication Data

US 2018/0281551 A1 Oct. 4, 2018

(30) Foreign Application Priority Data

Mar. 29, 2017 (DE) .................. 10 2017 205 336

(51) Int. Cl.
*B60G 17/08* (2006.01)
*B60G 17/033* (2006.01)
(Continued)

(52) U.S. Cl.
CPC ............. *B60G 17/08* (2013.01); *B60G 13/08* (2013.01); *B60G 17/033* (2013.01); *B60G 17/04* (2013.01);
(Continued)

(58) Field of Classification Search
CPC ...... B60G 17/08; B60G 17/033; B60G 17/04; B60G 13/08; B60G 21/06; B60G 2202/24; B60G 2204/162; B60G 2204/8304; B62D 33/0608; F16F 9/096; F16F 9/466

USPC ...... 188/266.5, 266.2; 280/5.5, 5.502, 5.504, 280/5.506, 5.507, 5.519, 6.157, 6.159, 280/124.106, 124.157, 124.16
See application file for complete search history.

(56) References Cited

U.S. PATENT DOCUMENTS 4,283,087 A * 8/1981 Kauss ................ B62D 33/0608
180/89.12
7,766,343 B2 * 8/2010 Bauer .................. B60G 17/015
280/5.5
(Continued)

FOREIGN PATENT DOCUMENTS

DE 3414257 A1 10/1985
DE 1101221 A1 7/1992
(Continued)

OTHER PUBLICATIONS

German Search Report issued in counterpart application No. 102017205336.4 dated Nov. 13, 2017. (10 pages).
(Continued)

*Primary Examiner* — Pamela Rodriguez

(57) ABSTRACT

A suspension system includes a hydraulic cylinder having a piston chamber in which a piston moves and a rod chamber in which a rod moves. The hydraulic cylinder operably moves between a retraction and an extension. The system also includes a throttle valve, a branching, and a hydraulic reservoir fluidly coupled to the hydraulic cylinder. A fluid flow from the piston chamber is divided at the branching into a first fluid flow portion and a second fluid flow portion. The first fluid flow portion flows to the rod chamber of the hydraulic cylinder, and the second fluid flow portion flows through the throttle valve to the hydraulic reservoir.

16 Claims, 9 Drawing Sheets

(51) Int. Cl.
  B60G 17/04 (2006.01)
  B60G 21/06 (2006.01)
  B62D 33/06 (2006.01)
  B60G 13/08 (2006.01)
  F16F 9/096 (2006.01)
  F16F 9/46 (2006.01)

(52) U.S. Cl.
  CPC ......... B60G 21/06 (2013.01); B62D 33/0608 (2013.01); F16F 9/096 (2013.01); F16F 9/466 (2013.01); *B60G 2202/24* (2013.01); *B60G 2204/162* (2013.01); *B60G 2204/8304* (2013.01)

(56) References Cited

U.S. PATENT DOCUMENTS 8,240,646 B2 * 8/2012 Scholl .................... B60G 17/08
267/274

2005/0051373 A1 * 3/2005 Bernhardt .......... B62D 33/0608
180/89.12
2013/0099456 A1   4/2013 Oshita et al.

FOREIGN PATENT DOCUMENTS

| DE | 102008012704 A1 | 9/2009 |
| DE | 102010051872 A1 | 5/2012 |
| DE | 102015007075 A1 | 12/2016 |
| EP | 2197697 B1 | 9/2014 |
| EP | 3059104 A1 * | 8/2016 |

OTHER PUBLICATIONS

European Search Report issued in counterpart application No. 18163321.5 dated Aug. 23, 2018. (6 pages).
European Communication pursuant to Article 94 (3) EPC issued in counterpart application No. 18163321.5, dated Oct. 23, 2019, 6 pages.

* cited by examiner

SUSPENSION SYSTEM

RELATED APPLICATIONS

This application claims priority to German Patent Application Ser. No. 102017205336.6, filed Mar. 29, 2017, the disclosure of which is hereby expressly incorporated by reference in its entirety.

FIELD OF THE DISCLOSURE

The present disclosure relates to a suspension system, and in particular a cab suspension including at least one hydraulic cylinder with a piston chamber and a rod chamber, where the hydraulic cylinder is connected to at least one hydraulic reservoir for retraction and extension.

BACKGROUND

Suspension systems are used, for example, in utility machines such as tractors or the like. In order to provide the driver with a highest possible comfort, utility machines can additionally be outfitted with a cab suspension in addition to the conventional vehicle suspensions.

In traditional systems, a costly control technology is often necessary to ensure a damping of the suspension system that is as smooth as possible. For the most part an expensive sensor system that registers the hydraulic status of the relevant hydraulic cylinder is required.

EP 2 197 697 B1 describes a suspension system, in particular a cab suspension, which has a hydraulic cylinder connected to a hydraulic reservoir. The system includes a throttle valve with two throttles. When the hydraulic cylinder is retracted, the entire fluid flow that is forced out of the piston chamber first flows through the first throttle and is then divided into a partial flow that flows into the hydraulic reservoir, and a partial flow that flows into the rod chamber of the hydraulic cylinder.

During extension, all of the fluid flow forced out of the rod chamber flows through the second throttle to the piston chamber of the hydraulic cylinder, and fluid is additionally supplied to the piston chamber from the hydraulic reservoir.

The two throttles have open cross sections that correspond to the ratio of the piston surface to the ring-shaped area of the hydraulic cylinder. Through this, the movement is damped the same in the case of extension and retraction if the valve setting is the same, since the fluid flows either through the one or the other throttle opening depending on the direction of movement.

This construction with two throttles is costly and necessitates a high expense for dimensioning the throttles causing power losses, since it can also lead, for example, to heating of the hydraulic fluid. In addition, the components become highly stressed during operation.

SUMMARY

In this disclosure, a suspension system may be provided that has a simple construction with relatively few components and at the same time guarantees a defined, optionally adjustable, damping. The system should be characterized by a long lifespan and reliable operation. In operation, the stress on the individual components should be as low as possible and power losses should be minimized. The damping of the suspension system should be, as far as possible, identical in retraction and extension, and the damping should be specifically adjustable. The stiffness of the suspension should be selectable and independent from the damping. For example, it should be adjustable. In addition, undesirable tilts, for example, of a cab travelling on a curved path should be avoided with the suspension system.

In one embodiment of this disclosure, the system has a branching for dividing a fluid flow from the piston chamber during retraction into a partial flow that flows to a piston chamber of a hydraulic cylinder and a partial flow that flows through a throttle valve to a hydraulic reservoir. Through the division, not all of the fluid, rather only a partial flow, flows from the piston chamber of the hydraulic cylinder through the throttle during retraction. In front of the throttle the other partial flow is diverted and is returned directly to a rod chamber of a hydraulic cylinder. This can be the rod chamber of the same hydraulic cylinder or the rod chamber of a different hydraulic cylinder. Because not all of the fluid flow is sent through the throttle, power losses, e.g., pressure losses, are reduced and a heating of the hydraulic fluid is also minimized. In addition, the throttle is not so highly stressed, which also can have a favorable effect on the lifespan of the suspension system.

In this embodiment, a size reduction of the throttle is possible. This has a favorable effect on the space required for it. In this way, a compact construction is achieved. The suspension system at the same time may provide a defined and precise adjustable damping, where the stiffness of the suspension system during retraction and extension can be influenced by means of a preload pressure in the hydraulic reservoir.

The suspension system according to the present disclosure enables a variable throttling and in doing so is able to manage with very few components. Only a relatively small expense for control is required, as a result of which a precise control accuracy is provided and adverse effects are avoided. In addition, the suspension system has a lower space requirement. As a result, the system can be realized cheaply and with a high reliability. Moreover, it is less susceptible to failure and can be made cheaply.

It turns out to be favorable if all of the fluid flow from the rod chamber flows through the throttle valve during extension without a dividing taking place first.

It proves to be particularly advantageous if roughly equal amounts flow through the throttle valve at the same speed of travel during retraction and extension, where the difference of the volume flows between retraction and extension is a maximum of 20%, or less such as a maximum of 10%, or even less such as a maximum of 5%. In another variation of the disclosure, the fluid flow that flows through the throttle of the valve during retraction largely corresponds to the fluid flow that flows through the throttle of the valve during extension.

In one embodiment of this disclosure, a proportional throttle valve is used. Through the use of the proportional throttle valve there is the possibility of needing to carry out the control process for the same damping only one time during the retraction and extension of the cylinder and at the same time to throttle it in a defined way.

In another embodiment, a rod is disposed in the rod chamber that has nearly the same cross section as a ring-shaped area that is formed around the rod of the piston. The cross section of the rod in this case deviates a maximum of 15%, or less such as a maximum of 10%, or even less such as a maximum of 5%, from the cross section of the ring-shaped area.

In a further embodiment of this disclosure, the cross section of the rod corresponds to the cross section of the ring-shaped area that is formed around the rod of the piston.

During retraction by a certain travel of the piston, an amount of fluid is forced out of the piston chamber that corresponds to the area of the piston times the said travel. During extension, a fluid amount is formed from the rod chamber that corresponds to the ring-shaped area around the rod times the relevant travel. The difference of these two volumes during retraction and extension, for an identical travel, corresponds to a fluid volume that results from the product of the cross-sectional surface of the rod and the corresponding travel. If the cross-sectional area of the rod corresponds to the ring-shaped area, then the partial flow that is returned to a rod chamber of the hydraulic cylinder during retraction is exactly the same size as the partial flow that is passed through the throttle of the valve. Here it is assumed that the speed of travel of the piston is the same during retraction and extension. An identical damping during retraction and extension is ensured by this design.

In yet another embodiment of the present disclosure, only one throttle, through which fluid flows during retraction and extension, is used per hydraulic cylinder. Thus, in contrast to traditional variations according to the prior art only one throttle is needed to guarantee an identical damping instead of two.

During extension, the entire fluid flow flows from the rod chamber through the throttle valve. It proves to be especially desirable if the fluid flow generated during extension flows from the rod chamber through the same throttle as the partial flow generated during retraction, where the fluid flow from the piston chamber, during retraction, is divided in front of the throttle into a partial flow, which flows directly back to a rod chamber of a hydraulic cylinder, and a partial flow that is sent through the throttle.

In a further embodiment, the suspension system may include backflow preventers, which block in one direction of flow and open in the other direction of flow. The backflow preventers are one-way fittings, where check valves are used.

In another embodiment, a backflow preventer is disposed in a fluid path between the piston chamber and the throttle valve, the backflow preventer opening during retraction and blocking during extension.

In addition, a backflow preventer can be disposed in a fluid path between the piston chamber and the hydraulic reservoir, the backflow preventer blocking during extension and opening during retraction.

In an embodiment of this disclosure, at least one hydraulic cylinder is connected to another hydraulic cylinder via a cross connection. Through the crosswise connection of the cylinders an improved roll stability is achieved. In this way, for example, an undesired tipping of the cab on a curve is efficiently prevented by the lowering of only one hydraulic cylinder.

During retraction, the entire partial flow from the piston chamber flows to the hydraulic reservoir through the throttle valve. A bypass flow directly to a hydraulic reservoir is avoided. Through this, a defined, adjustable damping is ensured.

The fluid flows divide into an equal ratio during retraction, so that the partial flow that flows to the rod chamber of a hydraulic cylinder is exactly the same size as the partial flow that is sent through the throttle to a hydraulic reservoir.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein.

DETAILED DESCRIPTION

Figure 1:
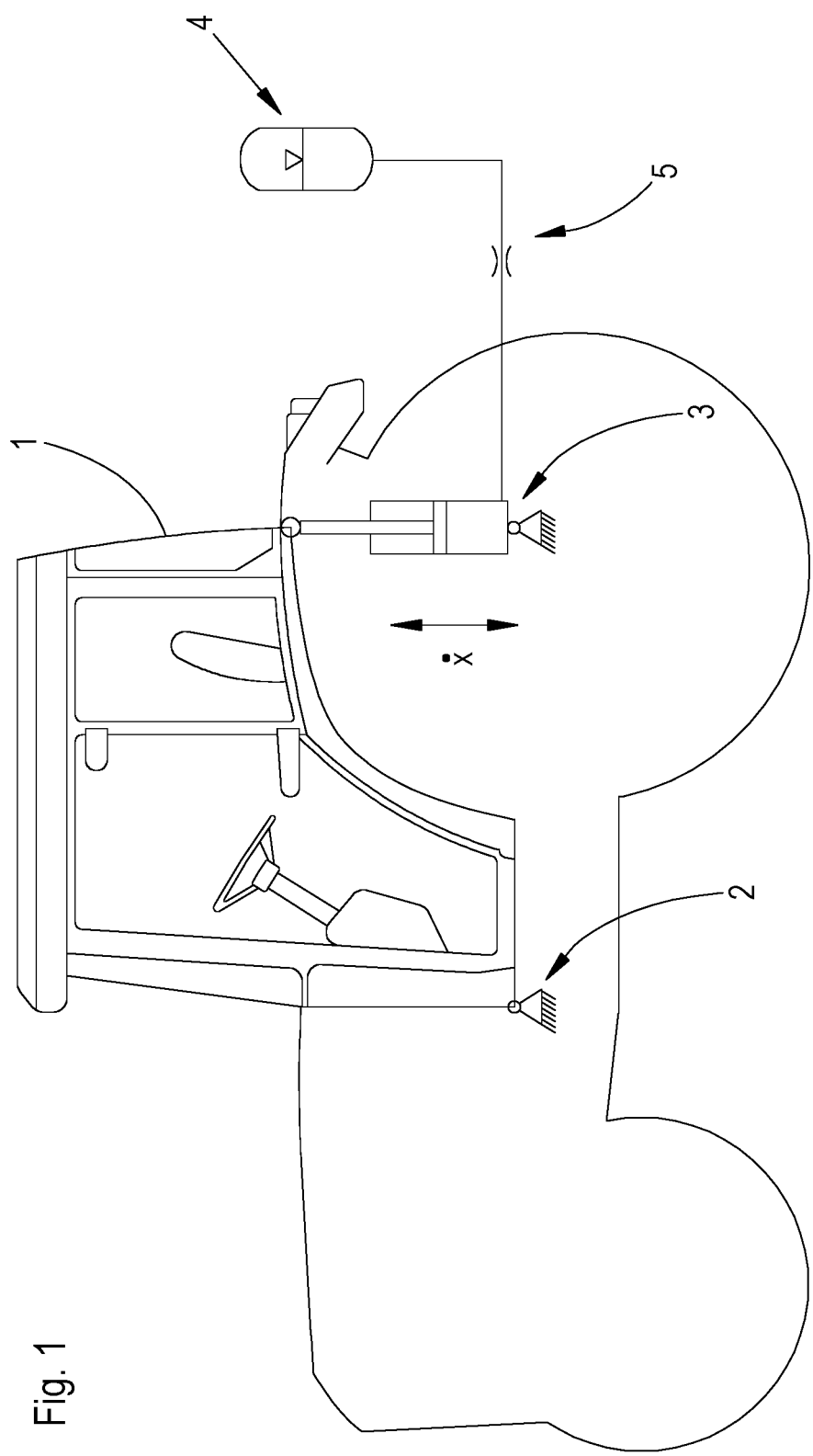
FIG. 1 shows a schematic representation of a cab suspension of a tractor in a side view.

FIG. 1 shows a schematic representation of a tractor with a cab suspension. Looking in the direction of travel, the cab 1 is supported at its forward side via a bearing 2 and at its rear side via hydraulic cylinders 3. The hydraulic cylinders 3 are connected to a hydraulic reservoir 4. A throttle 5 is disposed in a fluid path between the hydraulic cylinder 3 and the hydraulic reservoir 4. The hydraulic cylinder 3 ensures a suspension of vertical movements of the cab 1.

Figure 2:
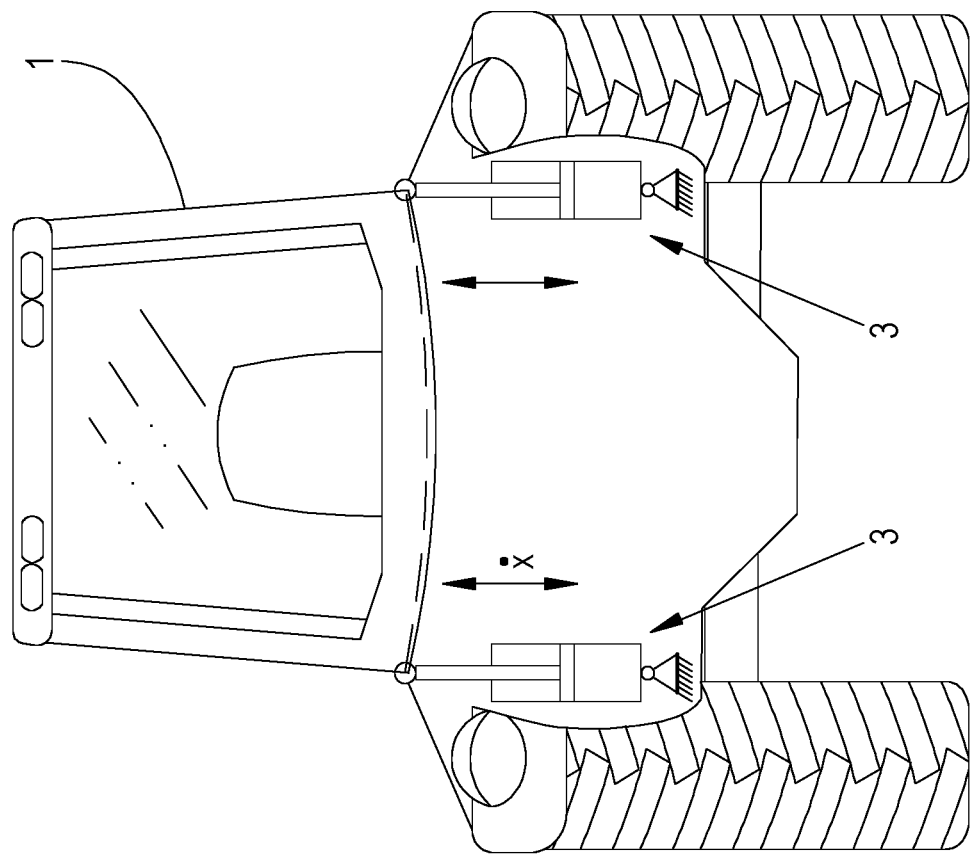
FIG. 2 shows a schematic representation of a cab suspension of a tractor seen from the rear.

FIG. 2 shows a schematic view of the tractor from the rear. Here, the cab 1 of the tractor is suspended via two hydraulic cylinders 3.

Figure 3:
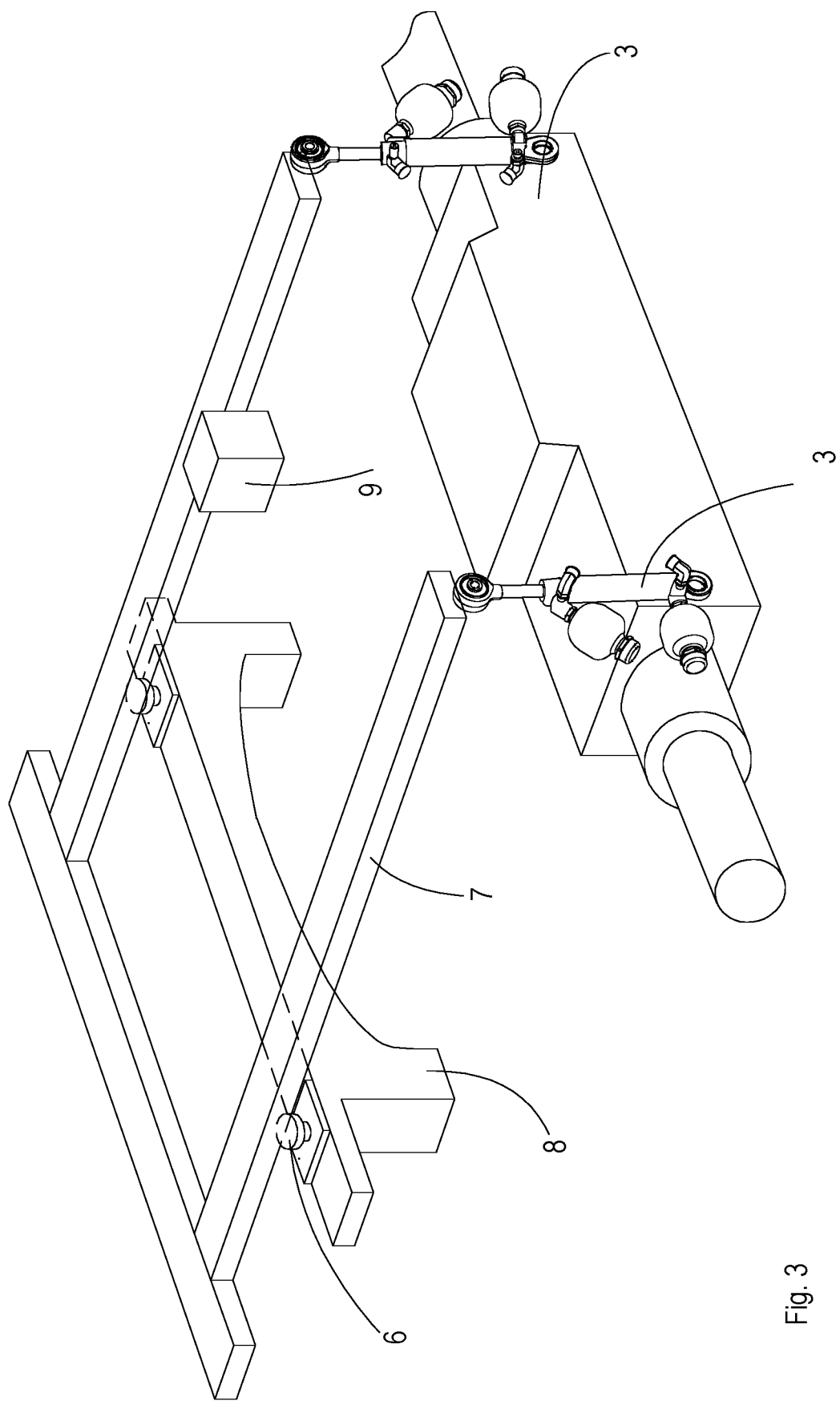
FIG. 3 shows a perspective view of a cab suspension.

FIG. 3 shows a perspective view of the cab suspension. The front support 2 includes two elastic elements 6 which are made as rubber pads in this example. The elastic elements 6 connect a frame 7 of the cab to the chassis 8 of the vehicle.

The elastic elements 6 provide for an uncoupling of the movements of the chassis 8 from the frame 7 of the cab 1. At the rear, the frame 7 of the cab 1 is uncoupled in its movements from chassis 8 via the hydraulic cylinders 3. The cab suspension includes a positioning system 9. The positioning system 9 brings the cab into an initial resting position in each case according to load. The positioning system 9 can bring the cab into an appropriate starting position in each case according to the weight of the driver, so that the same starting position of the suspension system is always produced without regard to the actual weight of the driver. For this, the positioning system 9 has appropriate sensors to appropriately adjust the position of the hydraulic cylinders 3.

The positioning system 9 is a part of the cab suspension. The positioning system 9 may be any conventional positioning system known in the art.

Figure 4:
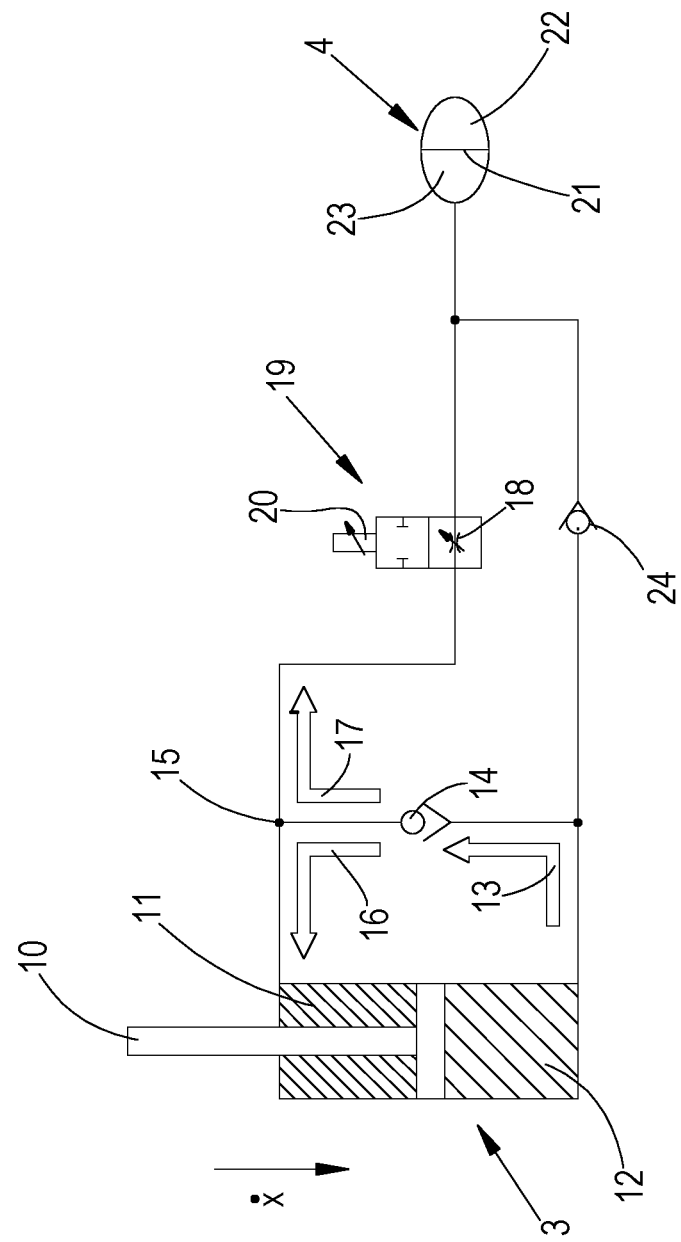
FIG. 4 shows a suspension system with a hydraulic cylinder during retraction.

FIG. 4 shows a hydraulic cylinder 3 of the suspension system during retraction. During retraction, the piston 10 of the hydraulic cylinder 3 moves downward. The hydraulic cylinder 3 includes a rod chamber 11 and a piston chamber 12.

During retraction, a fluid flow 13 is generated from the piston chamber 12 of the hydraulic cylinder 3 by the downward movement of the piston 10 by a specific travel. The fluid flow 13 flows through a backflow preventer 14, which opens during retraction. At a branching 15 the fluid flow 13 divides into a partial flow 16, which flows into the rod chamber 11 of the hydraulic cylinder 3, and a partial flow 17, which flows through the throttle 18 of a throttle valve 19 to the hydraulic reservoir 4. The throttle valve 19 includes a drive 20, which is made as an electromagnetic actuator in the illustrated embodiment. The throttle valve 19 includes ports for the corresponding flow paths. The throttle valve 19, which is completely closed in the neutral position (for the most part without flow) or has a pre-settable throttling initial opening cross section, releases an increasingly larger fluid cross section in proportion to the adjustment path. There is also the possibility that the throttle valve 19 is completely open in the neutral position (as a rule, without flow) and then is proportionally closed over the adjustment path. The drive 20 includes a return spring, which is not shown. The throttle valve 19 can be returned to its initial position via the return spring.

The hydraulic reservoir 4 is formed by a membrane reservoir in the illustrated embodiment. Here, the hydraulic reservoir 4 has a separating membrane 21, which separates a gas side 22 from a fluid side 23. The hydraulic reservoir 4 can be preloaded on the gas side 22 in dependence on the fluid pressure and forms an energy reservoir for the stored hydraulic energy.

The suspension system includes an additional backflow preventer 24, which is closed during retraction and thus prevents a fluid flow from the piston chamber 12 of the hydraulic cylinder 3 directly to the hydraulic reservoir 4. The backflow preventer 24 thus ensures that no bypass flow takes place, so that the fluid flow from the piston chamber 12 of the hydraulic cylinder 3 is sent to the hydraulic reservoir 4 via the throttle 18 of the throttle valve 19.

Figure 5:
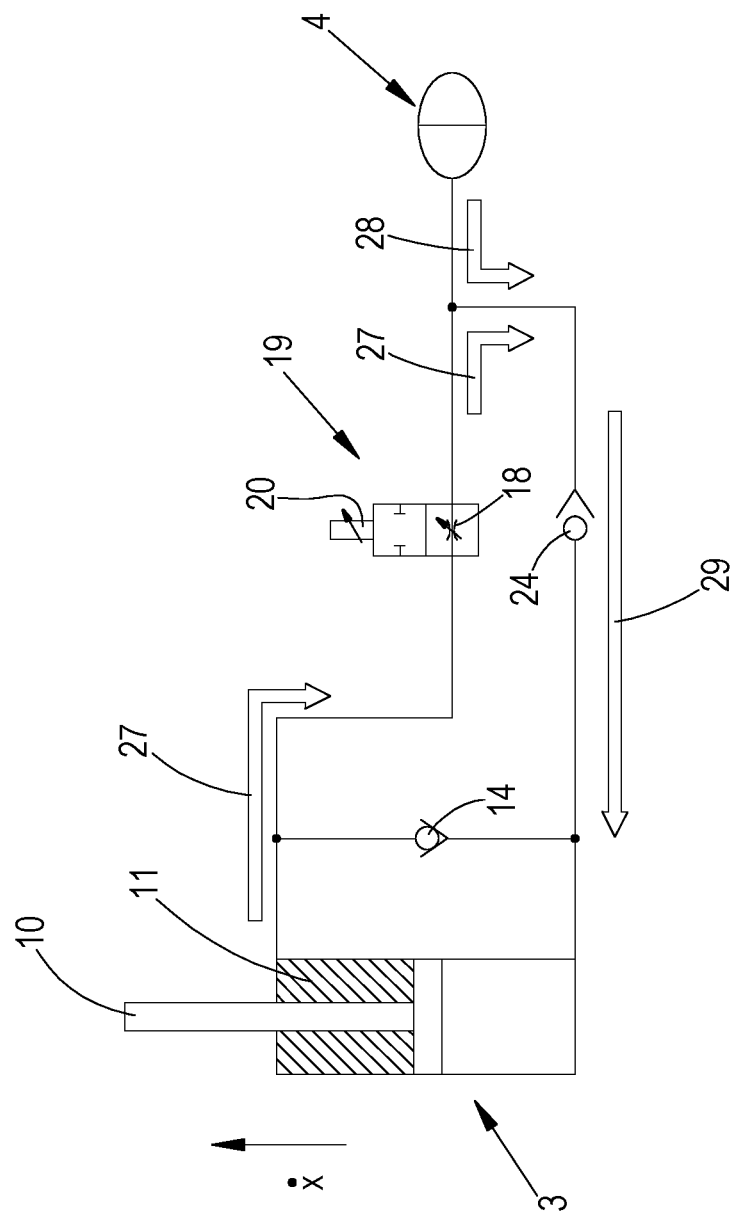
FIG. 5 shows a suspension system with a hydraulic cylinder during extension.
Figure 6:
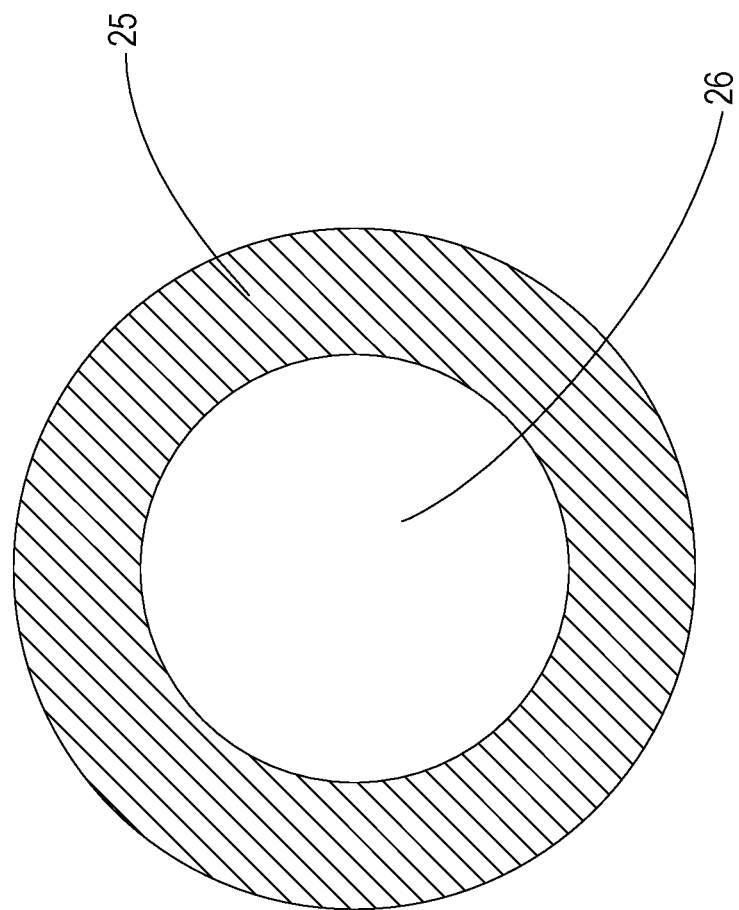
FIG. 6 shows a ratio of a rod cross section to a ring-shaped area on the piston rod side.

FIG. 5 shows the suspension system during extension. The piston 10 moves upward as shown by the arrow and a fluid volume is forced out of the rod chamber 11 of the hydraulic cylinder 3, the volume corresponding to the travel of the piston times the ring-shaped surface area 25 that is formed around the cross-sectional surface area 26 of the rod. The two surfaces 25 and 26 are shown in FIG. 6.

During the extension shown in FIG. 5, a fluid flow 27 is generated from the rod chamber 11 of the hydraulic cylinder 3. The backflow preventer 14 is closed during extension and prevents a flow to the piston chamber 12 of the hydraulic cylinder 3. The fluid flow 27 from the rod chamber 11 of the hydraulic cylinder 3 flows entirely through the throttle 18 of the throttle valve 19. At a branching, an additional fluid flow 28 from the hydraulic reservoir 4 is added to the fluid flow 27. A fluid flow 29, which is composed of the fluid flow 27 from the rod chamber and the added fluid flow 28 from the hydraulic reservoir 4, flows through the backflow preventer 24 to the piston chamber 12 of the hydraulic cylinder 3. The backflow preventer 24 is open during extension.

Figure 7:
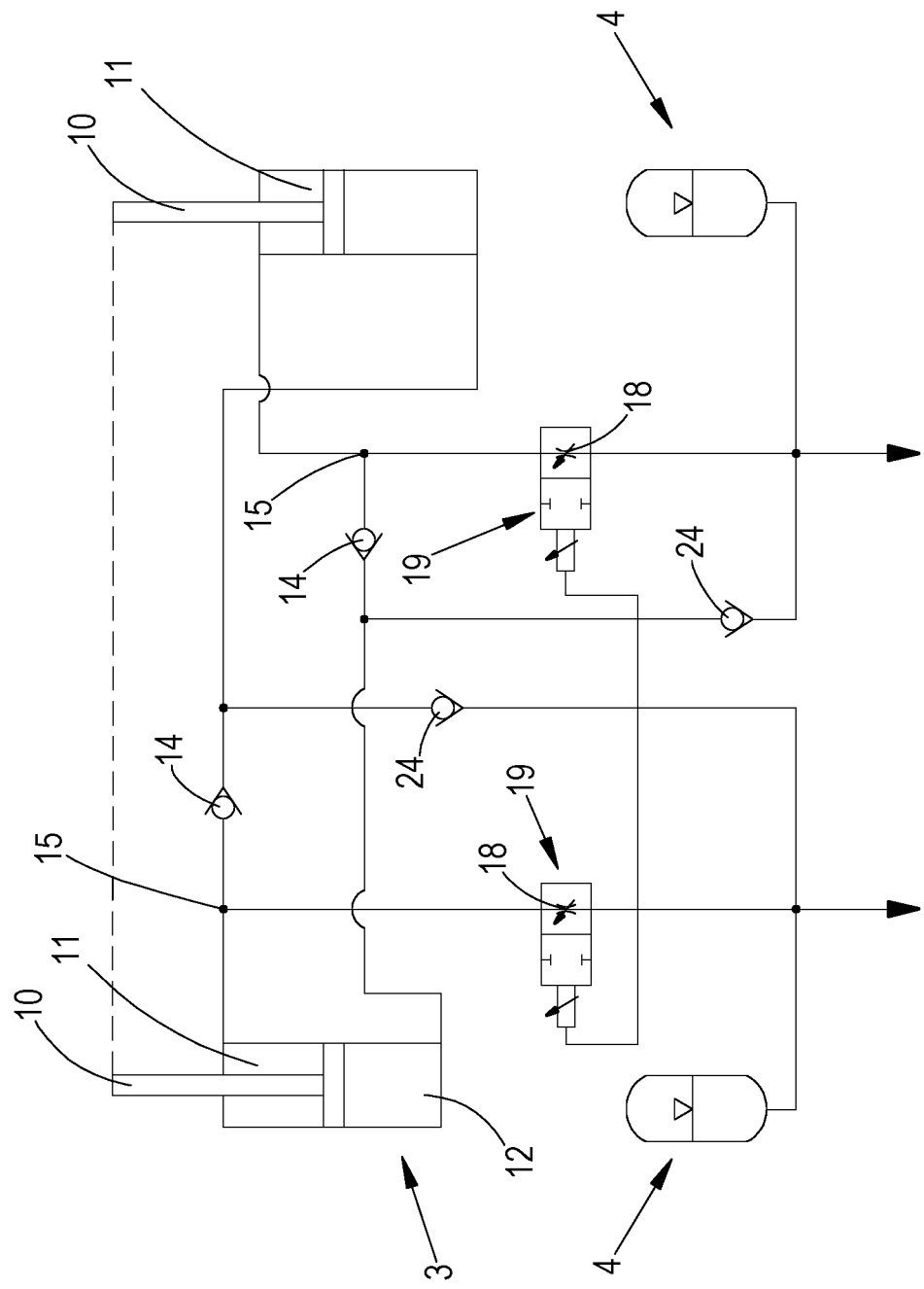
FIG. 7 shows a suspension system with two hydraulic cylinders in cross connection.
Figure 8:
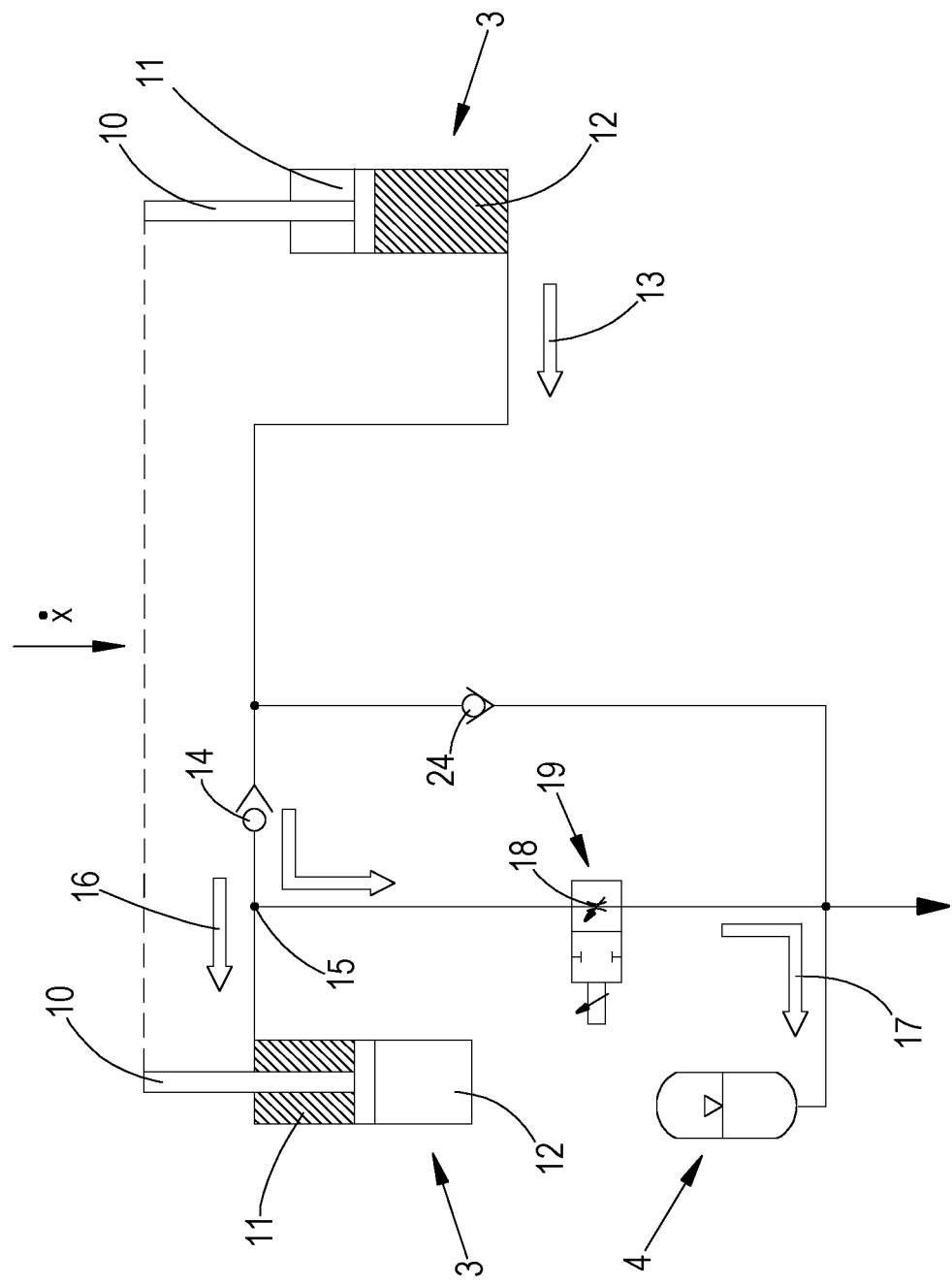
FIG. 8 shows a simplified representation of the cross connection during retraction.
Figure 9:
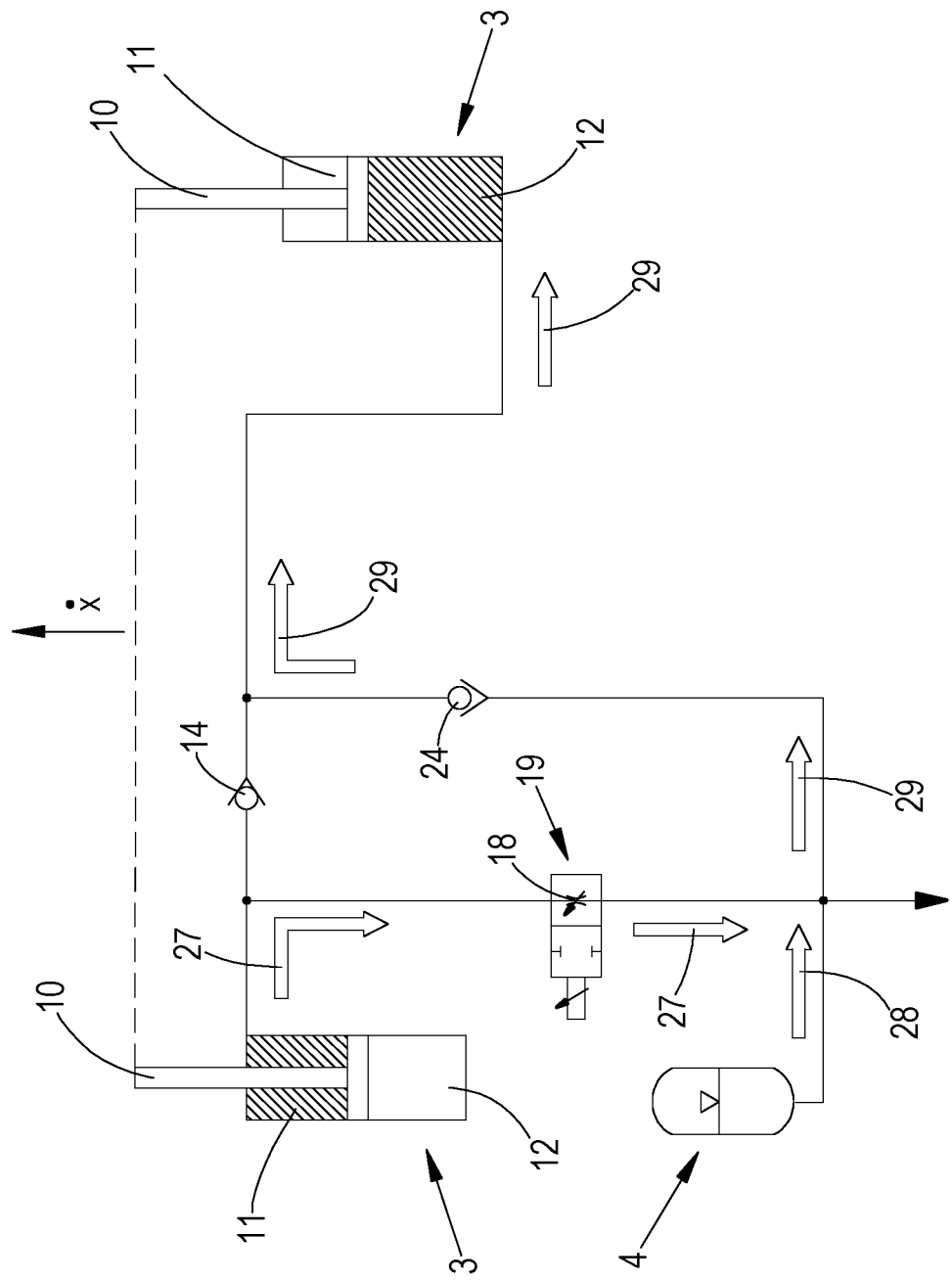
FIG. 9 shows a simplified representation of the cross connection during extension.

FIG. 7 shows a suspension system with two hydraulic cylinders 3, which are connected by a cross connection. The mode of operation of the cross connection is shown in FIGS. 8 and 9, which for better understanding are shown in simplified form. In this form they are not complete and not functional. The complete, functional version is shown in FIG. 7.

FIG. 8 shows a simplified representation of the cross connection during retraction. A fluid flow 13 is generated from the piston chamber 12 of the hydraulic cylinder 3 that is on the right in FIG. 8. At a branching 15, the fluid flow 13 divides into a partial flow 16 to the rod chamber 11 of the left-hand hydraulic cylinder 3 in this figure and into a partial flow 17 through a throttle 18 of the throttle valve 19 to a hydraulic reservoir 4. All of the backflow preventers 14 are open during retraction. All of the backflow preventers 24 are closed during retraction and prevent a bypass flow of the fluid flows 13 directly to a hydraulic reservoir 4, so that the fluid flows 13 are forced to flow initially through a throttle valve 19.

FIG. 9 shows a simplified representation of the cross connection during extension. Correspondingly, the pistons 10 of both hydraulic cylinders 3 move upward. From the left-hand hydraulic cylinder 3 in FIG. 8, a fluid flow 27 flows from the rod chamber 11 through the throttle 18 of the throttle valve 19. The fluid flow 27 forms, with an additional fluid flow 28 that is added from the hydraulic reservoir 24, a fluid flow 29, which flows through the backflow preventer 24 to the piston chamber 12 of the hydraulic cylinder 3 that is on the right in FIG. 8. All of the backflow preventers 24 are open during extension. All of the backflow preventers 14 are closed during extension and prevent a flow of the fluid flows 27 directly to the piston chamber 12, so that the fluid flow 27 is formed to flow through a throttle 18.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A suspension system, comprising:
   a first hydraulic cylinder including a piston chamber in which a piston moves and a rod chamber in which a rod moves, the first hydraulic cylinder operably movable between a retraction and an extension;
   a second hydraulic cylinder including a piston chamber in which a piston moves and a rod chamber in which a rod moves, the second hydraulic cylinder operably movable between a retraction and an extension;
   a throttle valve and a branching; and
   a hydraulic reservoir fluidly coupled to the first and second hydraulic cylinders;
   wherein a first fluid flow from the piston chamber of the first hydraulic cylinder is divided at the branching into a first portion and a second portion;
   wherein the first portion flows to the rod chamber of the second hydraulic cylinder, and the second portion flows through the throttle valve to the hydraulic reservoir; and
   wherein a second fluid flow from the rod chamber of the second hydraulic cylinder flows through the throttle valve to the piston chamber of the first hydraulic cylinder.

2. The suspension system of claim 1, wherein, during extension, the second fluid flow flows from the rod chamber of the second hydraulic cylinder through the throttle valve to the piston chamber of the first hydraulic cylinder.

3. The suspension system of claim 1, further comprising a backflow preventer configured to open during retraction and close during extension, the backflow preventer being disposed in a fluid path between the piston chamber of the first hydraulic cylinder and the throttle valve.

4. The suspension system of claim 1, further comprising a backflow preventer configured to close during retraction and open during extension, the backflow preventer being disposed in a fluid path between the piston chamber of the first hydraulic cylinder and the hydraulic reservoir.

5. The suspension system of claim 1, wherein the rod disposed in the rod chamber comprises the same cross section as a ring-shaped area formed around the rod of the piston.

6. The suspension system of claim 1, wherein the second portion flows through the throttle valve during retraction and extension.

7. The suspension system of claim 1 wherein the first portion and the second portion are equal in size.

8. The suspension system of claim 1, wherein a speed of travel of the piston is the same during retraction and extension.

9. The suspension system of claim 1, wherein the first and second portions are divided into equal amounts during retraction, so that the first portion is the same as the second portion that flows through the throttle valve to the hydraulic reservoir.

10. A suspension method for a cab of a machine, comprising:
providing a first hydraulic cylinder having a piston chamber in which a piston moves and a rod chamber in which a rod moves, a second hydraulic cylinder having a piston chamber in which a piston moves and a rod chamber in which a rod moves, a throttle valve, a branching, and a hydraulic reservoir fluidly coupled to the first and second hydraulic cylinders;
providing a first flow of fluid from the piston chamber of the first hydraulic cylinder by retracting the first hydraulic cylinder;
dividing the first flow of fluid into a first portion and a second portion;
flowing the first portion of fluid directly to the rod chamber of the second hydraulic cylinder;
flowing the second portion of fluid through the throttle valve to the hydraulic reservoir;
providing a second flow of fluid from the rod chamber of the second hydraulic cylinder by extending the second hydraulic cylinder; and
flowing the second flow of fluid through the throttle valve to the piston chamber of the first hydraulic cylinder.

11. The suspension method of claim 10, further comprising providing a throttle such that the flow of fluid passes through the throttle valve and the throttle.

12. The suspension method of claim 10, wherein the dividing step comprises dividing the first portion and the second portion of fluid into equal amounts during a retraction of the first hydraulic cylinder.

13. The suspension method of claim 10, wherein a speed of travel of the piston is the same during retraction and extension.

14. A suspension system, comprising:
a first hydraulic cylinder including a piston chamber in which a piston moves and a rod chamber in which a rod moves, the first hydraulic cylinder operably movable between a retraction and an extension;
a second hydraulic cylinder including a piston chamber in which a piston moves and a rod chamber in which a rod moves, the second hydraulic cylinder operably movable between a retraction and an extension;
a first throttle valve and a first branching;
a second throttle valve and a second branching;
a hydraulic reservoir fluidly coupled to the first and second hydraulic cylinders;
wherein a first fluid flow from the piston chamber of the first hydraulic cylinder is divided at the first branching into a first portion flowing to the rod chamber of the second hydraulic cylinder and a second portion flowing through the first throttle valve to the hydraulic reservoir;
wherein a second fluid flow from the piston chamber of the second hydraulic cylinder is divided at the second branching into a first portion flowing to the rod chamber of the first hydraulic cylinder a second portion flowing through the second throttle valve to the hydraulic reservoir;
wherein a third fluid flow from the rod chamber of the second hydraulic cylinder flows through the first throttle valve to the piston chamber of the first hydraulic cylinder;
wherein a fourth fluid flow from the rod chamber of the first hydraulic cylinder flows through the second throttle valve to the piston chamber of the second hydraulic cylinder.

15. The suspension system of claim 14, wherein the third fluid flow further comprises an additional fluid flow from the hydraulic reservoir to the piston chamber of the first hydraulic cylinder.

16. A suspension system of claim 14, wherein the fourth fluid flow further comprises an additional fluid flow from the hydraulic reservoir to the piston chamber of the second hydraulic cylinder.

* * * * *